United States Patent [19]

Ort

[11] 4,340,893

[45] Jul. 20, 1982

[54] SCANNING DRYER FOR INK JET PRINTERS

[75] Inventor: Donald L. Ort, Dallas, Tex.

[73] Assignee: Xerox Corporation, Stamford, Conn.

[21] Appl. No.: 204,093

[22] Filed: Nov. 5, 1980

[51] Int. Cl.³ .......................................... G01D 15/00

[52] U.S. Cl. .................................... 346/1.1; 346/75; 219/216

[58] Field of Search .................... 346/75, 1.1; 118/642; 101/416 A; 427/372.2; 219/216, 373, 367; 356/317, 338; 250/222 PC

[56] References Cited

U.S. PATENT DOCUMENTS 3,414,732 12/1968 Stegenga .................. 250/222 PC X 4,095,233 7/1978 Goffe .................................. 346/75

4,128,345 12/1978 Brady .............................. 346/75 X

FOREIGN PATENT DOCUMENTS 54-107735 8/1979 Japan ........................... 346/140 PD

*Primary Examiner*—Joseph W. Hartary

*Assistant Examiner*—S. D. Schreyer

*Attorney, Agent, or Firm*—Richard A. Tomlin

[57] ABSTRACT

A scanning carriage ink jet printer is provided wth ink drying apparatus on the carriage. The dryer allows a greater variety of inks and paper to be utilized. Preferably, drying apparatus is provided on both sides of the printer, parallel to the scanning direction of the carriage, to provide for bidirectional printing.

2 Claims, 2 Drawing Figures

SCANNING DRYER FOR INK JET PRINTERS

The invention relates to a method of ink jet printing in which relative motion between the ink jet emitter and the record medium is used for scanning the surface. In many cases, the ink jet emitter is located on a scanning carriage. By scanning is meant that the ink jet emitter is moved relative to the record surface on which it is desired to form an image.

In ink jet systems generally, it is desirable to have an ink which both dries quickly on the record surface but must not dry in the ink jet nozzle. These are conflicting requirements. The requirement for quick drying can be met in part by providing an external drying means. The IBM 6640 printer, for example, uses a heater and blower to dry the ink as the paper is drawn above the cylindrical platen. Because of this, the platen cannot be reverse indexed, and bail rollers cannot be used to hold the paper onto the platen without smearing the ink.

The invention as claimed herein is intended to provide a remedy. It solves the problem of how to dry ink on a record surface, allow the platen in scanning carriage printers to be reverse indexed as desired and allow the use of bail rollers. When the scanning is done by rotation rather than reciprocation, for example, on rotating drum recording surfaces, this invention allows the recording medium to be held against the cylindrical surface by rollers or fingers on the carriage. It does all this by concentrating the drying area around the printing point.

One way of carrying out the invention is described in detail below with reference to the drawing in which.

Figure 1:
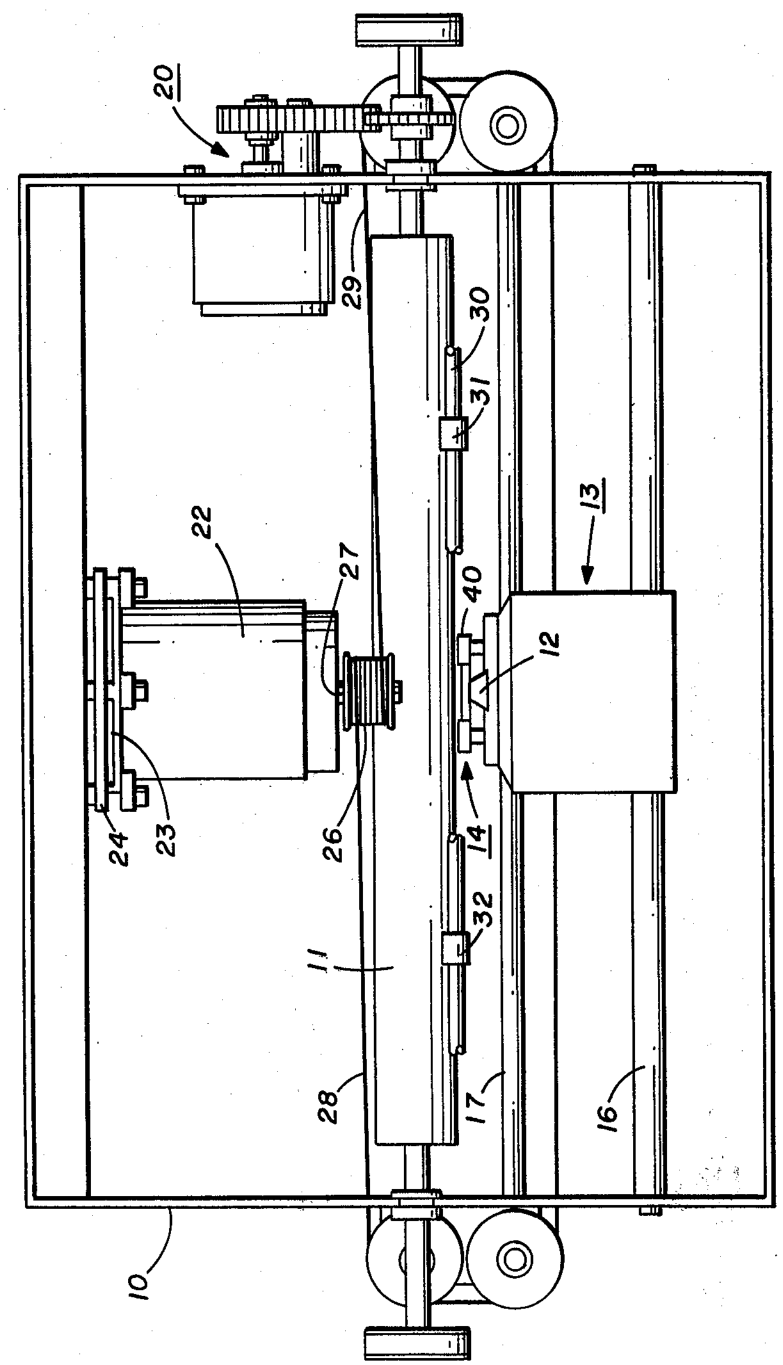
FIG. 1 is a top plan view of a printer embodying the present invention.

Referring now to FIG. 1, an overall plan view of an ink jet scanning carriage printer is illustrated contained within frame 10. The printer includes a platen or roller 11, which carries the paper or other record medium (not shown). The record medium is printed on by an ink jet droplet emitter 12 carried by carriage 13. The means for providing ink, the electrical signal and the transducer for emitting droplets are not shown being well known and conventional. For example, a scanning carriage ink jet printer is available commercially from Siemens.

Ink jet droplet emitter 12 is carried along a predetermined line of printing 35, along platen 11 by carriage 13. The carriage 13 is mounted for reciprocating linear movement on rails 16 and 17. The scanning carriage 13 includes ink jet emitter 12 and drying apparatus generally designated as 14.

Carriage 13 is transported from right to left or left to right continuously while printing occurs. The transport is provided by a motor 22, which may be either a servo motor or a stepping motor. For example, motor 22 may be part of a servo control system. In such a system, a rotary disc 23 is mounted on motor shaft 27 adjacent to a fixed disc 24. As discussed in U.S. Pat. No. 3,954,163, a series of parallel radial metal conductors is present on the discs and provides position signals for the servo system.

A pulley 26 is also mounted on motor shaft 27. Motor 22 drives carriage 13 by cable segments 28 and 29. The motor 22, in conjunction with the pulley 26 and cable segments 28 and 29, serves to transport the carriage from a center position in which it is shown to extreme left and right positions. Vertical paper feed assembly 20 and record member bail 30 and bail rollers 31 and 32 are also provided.

Figure 2:
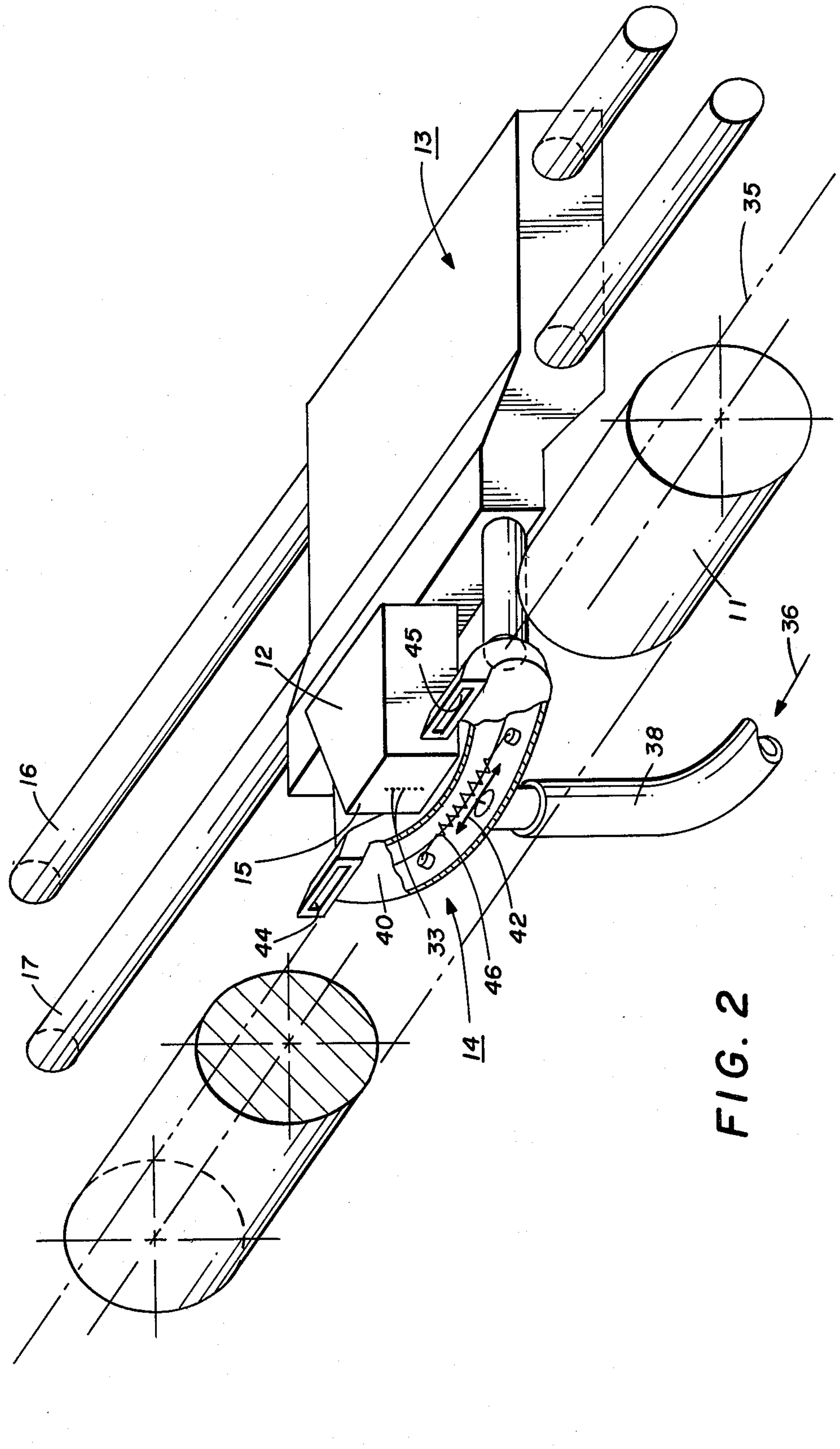
FIG. 2 is a perspective view in partial cross section showing the details of a typical dryer in accordance with the present invention.

Referring now to FIG. 2, there is shown ink jet droplet emitter 12, having nozzles 33 on the face 15 of ink jet droplet emitter 12, facing platen 11 so that when operated, nozzles 33 print on a predetermined line of printing represented by line 35. To dry the ink printed on line of printing 35, a dryer, generally designated as 14, is provided. In this preferred embodiment, a supply of air or other gas is provided as represented by arrow 36. This stream of gas can be provided by a blower (not shown), compressed air tank or other convenient source. This source may be located either on or external to the carriage. The gas flow is directed by gas supply hose 38 into the dryer body 40 shown partially cut away. Gas flow 42 in dryer body 40 divides as shown and is directed by dryer body 40 to dryer outlet ports 44 and 45, which ports direct the gas flow onto line of printing 35. The gas may, if desired, be heated to increase the degree of drying obtainable. The gas may be heated prior to its introduction into the gas supply hose 38. Alternatively, a heating element 46 may be provided in the dryer body 40 itself. Heating for the gas in either case may be provided by an electrical element, combustion or any desirable heat source.

In operation, as scanning carriage 13 reciprocates along rods 16 and 17, ink jet droplet emitter 12 prints on a record surface placed between the platen 11 and the ink jet emitter 12, along line of printing 35. As this printing occurs, a gas, which may be air and may or may not be heated, is directed through gas supply hose 38, the dryer body 40 and out ports 44 and 45 to impinge on the record surface at the line of printing 35 to effect drying of ink. An alternate source of heating, heating element 46, may be provided as desired. Gas supply hose 38 is made flexible so that it will be able to follow scanning carriage 13 as it reciprocates. Since ports 44 and 45 are located on either side of ink jet nozzles 33, drying will occur whether the carriage 13 is scanning and printing from left to right or from right to left. Alternatively, radiant electric heating elements could be used alone or in combination with a gas flow. In this case, heaters, such as electrical radiant heating elements, would preferably be located on either side of ink jet nozzles 33 where ports 44 and 45 are shown in FIG. 2 so that line of printing 35 would be exposed to radiant and possibly convected heat. If the velocity of the drying gas is sufficiently low to allow laminar flow conditions, the gas might be directed to enhance the travel of the ink droplets from the nozzles 33 to the record surface, thus reducing their time of flight. For gas velocities high enough to produce turbulence, baffles should be included to prevent that turbulence from interacting with the droplet streams and thus reducing the accuracy of placing the drops on the record surface. The method for designing channels and baffles to enhance either of these two gas flow paths will be familiar to one skilled in the art.

The efficiency of the dryer can be improved somewhat if recirculation is provided for at least a portion of the drying gas. Thus, collection ducts can be located above, below and/or on either side of the dryer ports 45 to collect gas that is deflected from the record surface. An alternative collector configuration utilizes coaxial ducts with the gas port 45 being either the inside duct with return along the periphery or the outside duct with gas return through the center. In any case, low pressure for the collection ducts can be provided by the input to the blower (not shown) or by an aspirator that creates a low pressure at a restriction in the gas flow line. Further drying efficiency can be obtained if sensors are used for monitoring drying conditions. For example, the humidity of the ambient air and the temperature and velocity of the drying gas will be somewhat indicative of the drying capability. The progress of the drying might be monitored by sensing the temperature of the record surface or by using a light source and detector to sense the specular reflection or glint from any undried ink surfaces. These or other monitored variables can be used simply to signal an operator, who might take any appropriate action, to regulate the drying capability. Alternatively, automatic feedback might be used to maintain the proper drying conditions without operator intervention. This automatic feedback might be as simple as a continuous analog temperature control or might utilize the printer digital microprocessor to combine inputs from several sensors in a complex control algorithm.

In the foregoing embodiments, the carriage 13 holding the ink jet droplet emitter 12 and the dryer 14 is caused to move so that it scans a line relative to the record surface. It should also be clear that the same principles relative to the dryer also apply if the carriage 13 is held stationary, and the record surface is caused to move to produce the scanning. Such scanning is encountered, for example, in the familiar manually powered typewriter. In addition, while the foregoing embodiments refer to reciprocating scanning, it should be clear that the same principles apply for unidirectional scanning in which rotary motion is employed. In such cases, the record medium is usually conformed to the surface of a cylinder. The printing head 12 and dryer 14 may be either inside or outside this cylinder. Then, either the head 12 and dryer 14 or the cylinder is rotated to produce the unidirectional scanning of one direction. Motion of either the print head 12 and dryer 14 or the cylinder in the axial direction produces the scan for the perpendicular direction. These rotary scans are commonly encountered, for example, in facsimile transceivers such as the Xerox 400 Telecopier. In all of these cases, drying is to be provided close to the actual printing point so that record medium handling and support can be provided with less restrictions with regard to ink smearing or transferring.

While the principles of the invention have been made clear in the illustrative embodiments, there will be many modifications in structure, arrangement, proportions, etc., which will occur to those skilled in the art. The appended claims are, therefore, intended to cover and embrace any such modifications within the scope and spirit of the invention.

What is claimed is:

1. A method of printing, which comprises:

(a) providing an ink jet droplet emitter on a scanning carriage;

(b) providing a record surface positioned such that when said ink jet droplet emitter emits droplets, it prints on said record surface along a predetermined line of printing;

(c) causing said ink jet droplet emitter to scan said record surface in a direction parallel to said predetermined line in a first direction;

(d) causing said ink jet droplet emitter to scan said record surface in a second direction parallel to but opposite in direction from said first direction;

(e) causing said ink jet droplet emitter to emit droplets while said ink jet droplet emitter is scanning in said first direction and in said second direction;

(f) providing a dryer for directing a drying gas positioned on both sides of said ink jet droplet emitter on said scanning carriage such that said dryer is positioned to dry droplets on said record surface in the vicinity of said droplet emitter by directing drying gas to said vicinity on both sides of said ink jet emitter; and (g) operating said dryer to dry ink jet droplets on said record surface.

2. The method of claim 1 wherein said dryer includes means for heating said drying gas.

* * * * *